United States Patent [19]
Kimberg

[11] Patent Number: 5,753,384
[45] Date of Patent: May 19, 1998

[54] AIR-COOLED METAL-AIR BATTERY

[75] Inventor: Sergey Kimberg, Jesusalem, Israel

[73] Assignee: Electric Fuel (E.F.L.) Ltd., Jerusalem, Israel

[21] Appl. No.: 451,012

[22] Filed: May 25, 1995

[51] Int. Cl.$^6$ .................................................... H01M 8/02
[52] U.S. Cl. ................................. 429/27; 429/34; 429/38
[58] Field of Search ........................... 429/27, 34, 26, 429/38, 39, 72

[56] References Cited

U.S. PATENT DOCUMENTS

| | | | |
|---|---|---|---|
| 4,578,324 | 3/1986 | Koehler et al. | 429/26 |
| 4,913,983 | 4/1990 | Cheiky | 429/13 |
| 5,212,024 | 5/1993 | Klink et al. | 429/72 |
| 5,230,966 | 7/1993 | Voss et al. | 429/26 |
| 5,318,861 | 6/1994 | Harats et al. | 429/21 |
| 5,354,625 | 10/1994 | Bentz et al. | 429/17 |
| 5,366,822 | 11/1994 | Korall et al. | 429/27 |

*Primary Examiner*—M. Nuzzolillo
*Attorney, Agent, or Firm*—Helfgott & Karas, P.C.

[57] ABSTRACT

The invention provides an electrochemical zinc-air multi-cell battery, each cell being of the type provided with a housing having a base, two major surfaces and two minor surfaces, defining an interior space for containing therein a zinc electrode; at least one generally planar air permeable but liquid impermeable air electrode, each of the at least one air electrode being installed in a window opening provided in at least one of the major surfaces; an electrolyte in contact with the zinc electrode and the air electrode; and means for directing a flow of reaction air from a scrubber across the outer faces of two adjacently interfacing air electrodes; the battery further having cooling-air, flow-directing means comprising a pair of spaced-apart thin plates positioned between adjacent cells, each thin plate having similar dimensions to the major surfaces and means being provided for forcing cooling-air to flow between the pair of thin plates, the outer faces of the thin plates being arranged to be in contact with and to cool the reaction air.

11 Claims, 3 Drawing Sheets

AIR-COOLED METAL-AIR BATTERY

The present invention relates to a cooled metal-air battery.

More particularly, the invention provides a reliable air-cooling device suitable for extracting large quantities of heat from a mechanically rechargeable zinc-air battery intended for vehicle propulsion.

All electric batteries generate heat during operation, one source thereof being the chemical reaction taking place in the cells, and the second source being the current flow meeting the ohmic resistance of the battery itself. In most batteries, such heat is dissipated naturally, mainly by convection. However, batteries designed to power electric vehicles are designed to provide high power from a compact battery envelope, and may exhibit a high temperature rise if no additional provision is made for cooling. Further aggravating the problem is the consideration that road vehicles need to be designed to allow operation in ambient temperatures as high as 45°–50° C.; under such conditions, the generated heat may raise battery temperature to a level causing battery damage.

While a high operating temperature is not necessarily detrimental to battery performance, there are several reasons justifying some cooling arrangement in a battery of this type. First, in a naturally cooled battery, the inner cells will operate at a considerably higher temperature than those on the battery perimeter, leading to operating differentials between the cells. Second, it is often advantageous to use the heat removed from the battery for heating the passenger compartment of the vehicle, when required. Third, premature deterioration due to heat of solid and liquid materials in the battery must be prevented.

Cooling systems for electric batteries are described in U.S. Pat. Nos. 754,969; 3,767,468; 4,007,315; 4,463,064; 4,578,324; and 5,212,024. These specifications disclose various systems for circulating a cooling gas such as air, or a liquid such as water, through the battery for removing heat therefrom.

Cooling systems for the electrolyte are described in U.S. Pat. Nos. 3,290,176; and 5,093,213. While such systems have certain advantages, particularly in achieving electrolyte mixing to even out concentration differences, these systems require pumping means and are more complex and heavier than systems using direct air cooling. Surprisingly, electrolyte cooling systems extract only about 40 watts of heat from each battery cell of a size approximately 24 cm by 24 cm, e.g., one suitable for use in a battery for road vehicle propulsion.

Systems designed to have a flow of cooling air directed across the tops of metal current collector frames only maintain a removal capacity of about 20 watts for the above-mentioned battery cell size, which is approximately only 25% of the capacity needed in a practical road-vehicle propulsion battery. It is possible to increase the flow rate of reaction air contacting the air electrodes sufficiently to remove any excess heat by using a large blower. This arrangement is well-suited for short-term use, for example, in batteries for torpedo propulsion, which have an operating life of only a few minutes. However, if the air flow rate across the air electrode is much in excess of that required to supply reaction oxygen, it will eventually cause the drying out of the electrolyte from the air electrode, which will cause the cell to have an unacceptable power loss.

Since air contains about 0.0314% by volume of carbon dioxide, which gas is known to be detrimental to a high efficiency operation of metal-air cells, this causes a further impediment to increasing the flow of reaction air sufficiently for use as a cooling medium. Accordingly, the present inventors have proposed a form of scrubber device suitable for use in conjunction with batteries, as described in U.S. application Ser. No. 08/210,333. Scrubber devices for removal of $CO_2$ usually involve the use of a $CO_2$-absorbent material, for example, granular alkali metal hydroxide or aqueous alkali metal hydroxide absorbed on a porous carrier. No matter whichever absorber material is used, the absorber will become chemically exhausted after extensive use, and require replacement or chemical recharging. Premature absorber exhaustion may be avoided by using the scrubber only for processing the quantity of air containing sufficient oxygen for battery reaction. However, the quantity of air required for battery operation has been found insufficient for achieving a high rate of cooling.

It is therefore one of the objectives of the present invention to provide a zinc-air battery which has a high heat extraction capacity system sufficient to remove a minimum of 50 watts of heat from each cell of a battery size used in a road vehicle propulsion battery.

Also, it is a further objective of the present invention to remove heat from the air adjacent to the major surfaces of battery cells by use of a forced air cooling system.

The present invention achieves said objectives by providing an electrochemical zinc-air multi-cell battery, each cell being of the type provided with a housing having a base, two major surfaces and two minor surfaces, defining an interior space for containing therein a zinc electrode; at least one generally planar air permeable but liquid impermeable air electrode, each of the at least one air electrode being installed in a window opening provided in at least one of the major surfaces; an electrolyte in contact with the zinc electrode and the air electrode; and means for directing a flow of reaction air from a scrubber across the outer faces of two adjacently interfacing air electrodes; the battery further having cooling-air, flow-directing means comprising a pair of spaced-apart thin plates positioned between adjacent cells, each thin plate having similar dimensions to the major surfaces and means being provided for forcing cooling-air to flow between the pair of thin plates, the outer faces of the thin plates being arranged to be in contact with and to cool the reaction air.

In a preferred embodiment of the present invention, there is provided a zinc-air battery as described above, wherein said pair of thin plates is made of a plastic.

In a most preferred embodiment of the present invention, there is provided a zinc-air battery wherein the flow rate of said cooling air exceeds the flow rate of said reaction air by a factor of at least two.

In especially preferred embodiments of the present invention, said zinc-electrode is formed of a generally planar electrically conductive skeletal member encompassed by an active metal component, comprising porous zinc particles formed into a static bed of slurry impregnated with an electrolyte and said interior space of said housing communicates with an opening opposite said base through which said zinc electrode is removable to enable the mechanical replacement thereof with a freshly charged metal electrode;

It will now be appreciated that the battery of the present invention has arrangements for two separate air flows, heat being transferred from the reaction air to the cooling air. The two air flows may, however, originate from a single air blower. Reaction air is supplied in sufficient quantity to operate the battery, while a larger quantity of cooling air is used to extract unwanted heat from the reaction air. Tests have been carried out on a battery having cells sized 24 cm by 24 cm and it has been found that 80 watts of heat can be extracted from each cell. Such a result is adequate for the satisfactory operation of a compact, high-power battery necessary for economic operation in road-vehicle propulsion.

It is to be noted that plastics are usually not considered as suitable candidates for use in heat-exchange applications, as metals have heat conductivities which are approximately a thousand times larger than typical solid plastics. This consideration is, however, based on an oversimplified view of what actually transpires when heat is transferred by conduction through a wall. Both the hotter and the cooler surface of the wall are covered by a thin film of the respective medium, air in the present application, in contact which such a wall. The value of the film coefficient depends on many factors, among them thermal conductivity, viscosity, density and specific heat. Precise calculations are complex, but, as a rule, unless flow is turbulent and the heat exchange wall is thick, the resistance to heat flow of each single film is typically many times greater than the resistance of the solid material comprising the wall; there are, of course, two such air films, and the thin film of still air which is in close contact to the wall is a very poor heat conductor.

This consideration is of particular effect in the present invention, where the wall thickness used is very small, approximately one millimeter, and due to limitations on blower power consumption, air flows are expected to be laminar. The end result is that when total heat resistance is considered, and not merely the heat conductivity of the wall material; a thin wall made of a solid plastic is only moderately inferior to a metal in this application.

Plastics have several compensating attractive properties for use as cooling air flow directing means in the present invention, such as light weight, low fabrication costs and excellent resistance to chemical attack by the alkaline medium prevalent in batteries of the type described. For example, in comparing an equal thickness of copper to polypropylene, the plastic offers a weight advantage of a factor of 9.9. Such an advantage is of considerable importance in a battery intended for road vehicle propulsion, wherein low weight is a crucial requirement for attaining acceptable vehicle performance.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
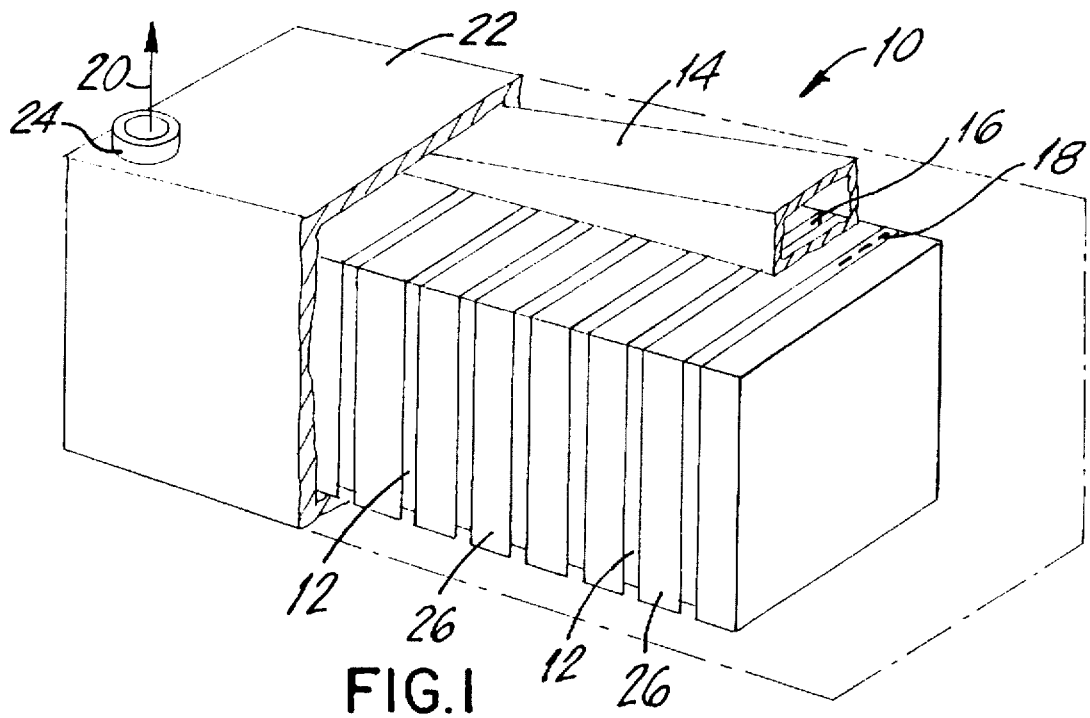
FIG. 1 is a perspective, fragmented view of a preferred embodiment of the cooled battery according to the invention.

There is seen in FIG. 1 an electrochemical zinc-air multi-cell battery 10, of the type for multiple discharge and recharge cycles. Cooling air flow directing means 12, shown in more detail in FIG. 3, receive air from a manifold duct 14 positioned along the length of the battery 10, manifold outlets 16 being connected to air entry ports 18.

Cooling air 20 leaves the battery case 22 through an outlet port 24. In the present embodiment the manifold cut 14 is positioned for convenience along the upper edges of the battery cells 26. Depending on space considerations and access for servicing, the manifold duct 14 can be positioned to introduce the cooling air 20 from the side of the cell 26 array.

Figure 2:
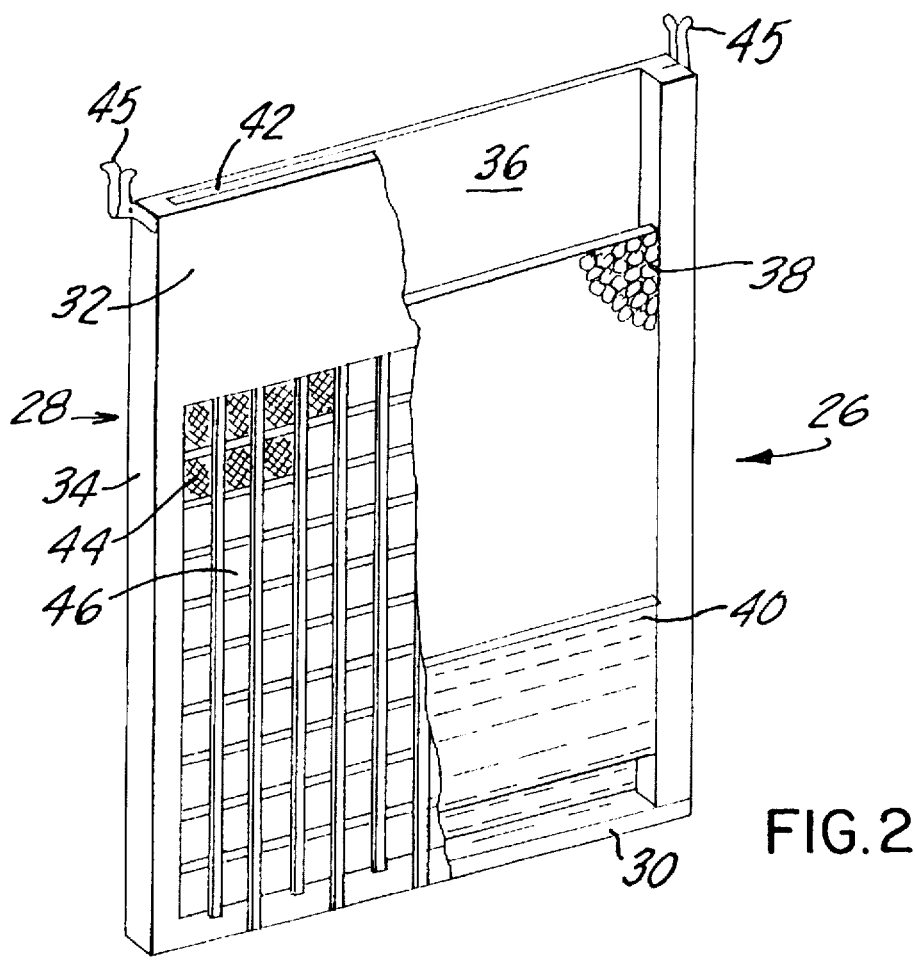
FIG. 2 is a perspective, fragmented view of one of the battery cells.

Referring now to FIG. 2, there is seen in more detail one of the battery cells 26, which is provided with a cell housing 28 having a cell base 30, two major surfaces 32 and two minor surfaces 34 defining an interior space 36. Contained therein is a replaceable porous particle zinc electrode 38, which acts as the anode, impregnated with an electrolyte 40. The interior space 36 communicates with an opening 42 opposite the base 30.

The cell 26, and thus the battery 10 of which it is a part, is mechanically rechargeable. The opening 42 allows selective removal of the replaceable zinc electrode 38, and its replacement with a freshly charged metal electrode.

In the shown embodiment there are two generally planar air permeable but liquid impermeable air electrodes 44 in each cell which act as cathodes. Each air electrode 44 is installed in a lattice window opening 46 provided in the major surfaces 32. An electrolyte 40 held in the interior space is in contact with the zinc electrode 38 and with both air electrodes 44. Cell output is delivered through a pair of terminal clips 45.

Figure 3:
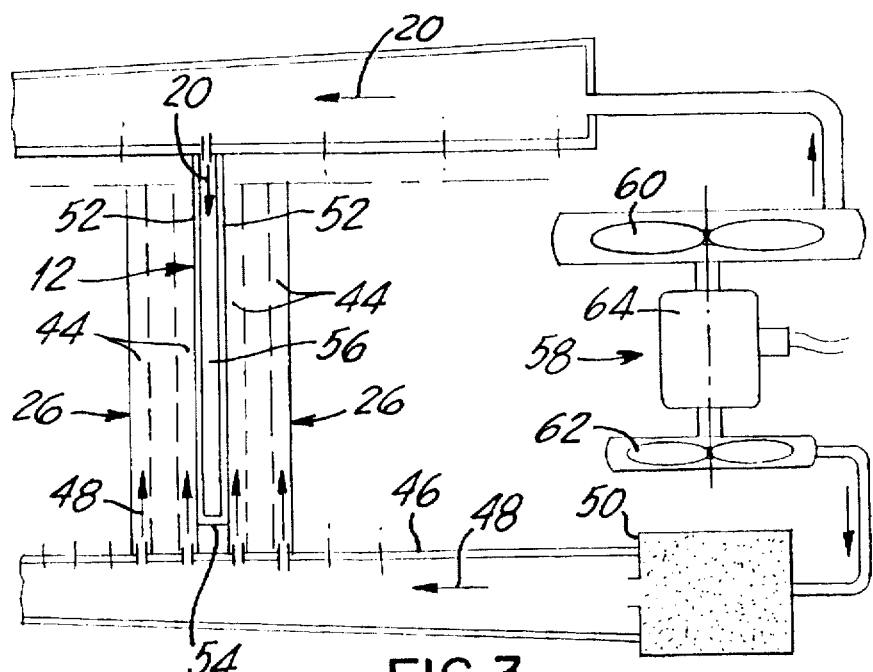
FIG. 3 is a schematic view of a pair of battery cells separated by an air cooling unit.

FIG. 3 shows manifold means 46 being provided for directing a flow of reaction air 48 from a scrubber 50 across the outer faces of two adjacently interfacing air electrodes 44.

The cooling air flow directing means 12 substantially comprise a pair of spaced-apart thin plates 52 positioned between adjacent cells 26. Each thin plate 52 has similar dimensions to the cell major surfaces 32. Preferably, as shown, the pair of spaced-apart thin plates 52 form an integral unit 54 shaped as a hollow plate having multiple air passages 56.

The thin plates 52 suitably are made of copper, corrosion protection being provided by plating with nickel, silver or iridium.

Lower weight and lower manufacturing costs are achieved by use of a plastic such as polypropylene. Due to the thin wall thickness used—one millimeter or less—an integral flow direction means unit 54 made of a plastic will provide an acceptable performance level, as has been explained hereinbefore.

Means, such as an air blower 58, are provided for forcing cooling air 20 to flow between the pair of thin plates 52. The outer faces of the thin plates 52 are arranged to be in contact with and to cool the reaction air 48.

In the embodiment shown, the air blower 58 is electrically driven. However, a revolving shaft (not shown) is usually available in road vehicles, such a shaft serving to drive by means of a belt or belts a variety of vehicle accessories. Where such a shaft or belt is in fact available, the air blower 58 may be driven therefrom.

The flow rate of the cooling air 20 preferably exceeds the flow rate of the reaction air 48 by a factor of at least two. The air blower 58 has two differently sized impeller units 60 and 62, both driven by the same motor 64, and can conveniently supply such air flows.

Figure 6:
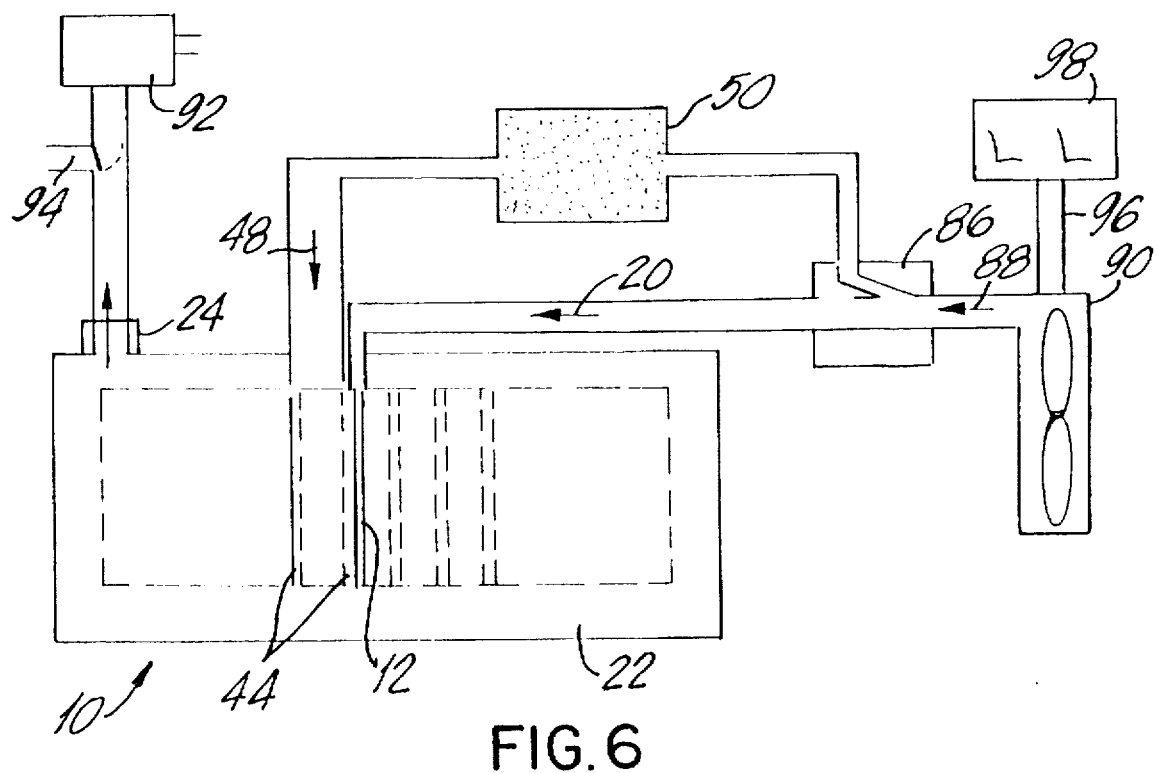
FIG. 6 is a schematic view of air flow in a battery with an air flow divider receiving an air stream from an air blower.

The supply of cooling air will be further referred to with reference to FIG. 6.

Figure 4:
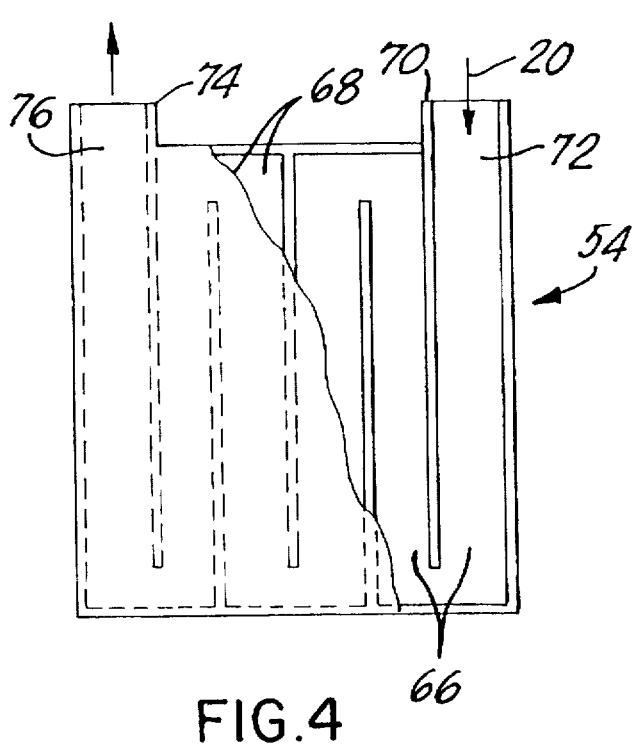
FIG. 4 is an elevational, fragmented view of an embodiment wherein an extended length flow channel is provided between the pair of thin plates.

Seen in FIG. 4 is a detail of cooling air directing means 54 wherein an extended length, snake-like flow channel 66 is provided for leading cooling air 20 between a pair of thin plates 68. A cooling air inlet port 70 is provided at one extremity 72 of the channel 66 and an outlet port 74 is provided at the opposite extremity 76 thereof. The extended length flow channel 66 allows more time for heat exchange and thus reduces the overall temperature difference between the hotter reaction air 48, shown in FIG. 3, and the cooling air 20.

Figure 5:
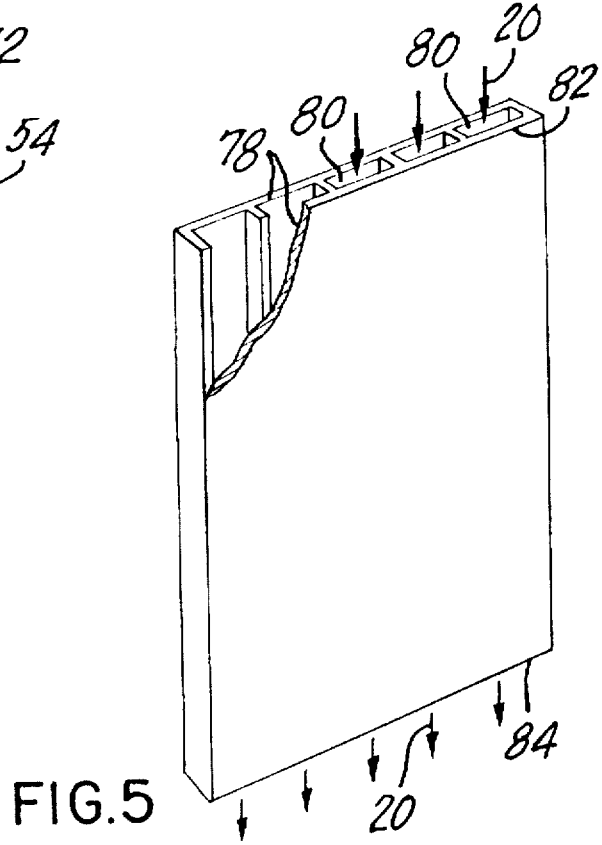
FIG. 5 is a perspective, fragmented view of an embodiment wherein multiple parallel flow channels are provided between the pair of thin plates.

FIG. 5 depicts a further embodiment of thin cooling plates 78. Multiple parallel flow channels 80 are provided between the pair of thin cooling plates 78, a cooling air entry port (not shown) being provided along one edge 82 and an air discharge port (not shown) along an opposite edge 84 of the plates 78. This embodiment provides for faster air flow and less pressure drop than the arrangement described with reference to FIG. 4.

Seen in FIG. 6 is the air flow arrangement for a zinc-air battery 10 further provided with an air flow divider 86.

The divider 86 receives an air flow 88 from an air blower 90, provided with only a single impeller. The divider 90 directs a part of this flow, typically a minor portion, to a $CO_2$ scrubber 50 and then to the air electrodes for use as reaction air 48. The divider 86 directs the remaining air flow 20 to the cooling air flow 12 directing means.

All the air provided by the air blower 90 to the battery case 22 is exhausted therefrom through an outlet port 24. From this port 24 it is directed to a vehicle passenger compartment heater 92 if required, or if not required it is discharged into the atmosphere at 94.

The air blower 90 has a further outlet branch 96 for use in ventilation of the passenger compartment 98, if required.

It will be evident to those skilled in the art that the invention is not limited to the details of the foregoing illustrative embodiments, and that the present invention may be embodied in other specific forms without departing from the essential attributes thereof, and it is therefore desired that the present embodiments be considered in all respects as illustrative and not restrictive, reference being made to the appended claims, rather than to the foregoing description, and all changes which come within the meaning and range of equivalency of the claims are therefore intended to be embraced therein.

What is claimed is:

1. An electrochemical zinc-air multi-cell battery, each cell being of the type provided with
    a housing having a base and two major surfaces and two minor surfaces defining an interior space for containing therein a zinc electrode;
    at least one generally planar air-permeable but liquid-impermeable air electrode, each of said at least one air electrode being installed in a window opening provided in at least one of said major surfaces;
    an electrolyte in contact with said zinc electrode and said air electrode;
    means for directing a flow of reaction air from a scrubber across the outer faces of two adjacently interfacing air electrodes; and
    cooling air flow directing means comprising a pair of spaced-apart plates positioned between adjacent cells, each plate being substantially the same size as said major surfaces for forcing cooling air to flow between said pair of plates, the outer faces of said plates being arranged to be in contact with and to cool said reaction air.

2. A zinc-air battery as claimed in claim 1, wherein said pair of spaced-apart plates are an integral part formed as a hollow plate.

3. A zinc-air battery as claimed in claim 1, wherein said pair of plates is made of a plastic.

4. A zinc-air battery as claimed in claim 1, wherein said pair of plates is made of copper.

5. A zinc-air battery as claimed in claim 4, wherein said pair of copper plates is plated with a metal selected from a group consisting of nickel, silver, and iridium.

6. A zinc-air battery as claimed in claim 1, wherein an extended-length serpentine flow channel is provided between said pair of plates, a cooling air inlet port being provided at one extremity of said channel and an outlet port being provided at the opposite extremity thereof, said extended-length flow channel permits said cooling air to remain in said channel for a period of time greater than that of a straight chamber for providing greater cooling.

7. A zinc-air battery as claimed in claim 1, wherein multiple parallel flow channels are provided between said pair of plates, a cooling air entry port being provided along one edge and an air discharge port along an opposite edge of said plates.

8. A zinc-air battery as claimed in claim 1, wherein said cooling air flow directing means includes a manifold duct positioned along the length of said battery, manifold outlets being connected to said air entry ports.

9. A zinc-air battery as claimed in claim 1, wherein the flow rate of said cooling air exceeds the flow rate of said reaction air by a factor of at least two.

10. A zinc-air battery as claimed in claim 1, further provided with an air flow divider receiving an air flow form an air blower, and directing a part of this flow said cathode plates for use as reaction air and directing the remaining air flow to said cooling air flow directing means.

11. A zinc-air battery as claimed in claim 1, wherein said zinc electrode is formed of a generally planar electrically conductive skeletal member encompassed by an active metal component, comprising porous zinc particles formed into a static bed of slurry impregnated with an electrolyte and said interior space of said housing communicates with an opening opposite said base through which said zinc electrode is removable to enable the mechanical replacement thereof with a freshly charged metal electrode.

\* \* \* \* \*